United States Patent [19] [11] 4,186,685

Chenel et al. [45] Feb. 5, 1980

[54] APPARATUS FOR APPLYING A THICK SEAL TO A GLASS SHEET

[75] Inventors: Pierre Chenel, Enghien les Bains; Michel Moncheaux, Chalon sur Saone, both of France

[73] Assignee: Saint-Gobain Industries, Neuilly-sur-Seine, France

[21] Appl. No.: 852,810

[22] Filed: Nov. 18, 1977

Related U.S. Application Data

[63] Continuation of Ser. No. 639,787, Dec. 11, 1975, abandoned.

[30] Foreign Application Priority Data

Dec. 11, 1974 [FR] France ................................ 74 40824

[51] Int. Cl.$^2$ ........................ C03C 27/10; B05C 3/18; B05C 3/20

[52] U.S. Cl. .................................... 118/410; 156/109; 156/500

[58] Field of Search ................ 118/410; 156/109, 500, 156/107, 566, 244.11; 425/192

[56] References Cited

U.S. PATENT DOCUMENTS

| | | | |
|---|---|---|---|
| 2,035,247 | 3/1936 | Royle | 425/192 X |
| 2,726,632 | 12/1955 | Asbeck et al. | 118/410 |
| 2,732,587 | 1/1956 | Greene | 425/192 |
| 2,788,051 | 4/1957 | Tuttle | 156/244.11 X |
| 2,821,745 | 2/1958 | Patton | 425/192 X |
| 2,942,293 | 6/1960 | Wahl | 118/410 X |
| 3,162,886 | 12/1964 | Wise | 118/410 X |
| 3,632,279 | 1/1972 | Christy | 425/192 |
| 3,758,996 | 9/1973 | Bowser | 52/172 |
| 3,759,771 | 9/1973 | Battersby | 156/109 |
| 3,817,674 | 6/1974 | Paige | 425/192 X |
| 3,852,149 | 12/1974 | Sitter et al. | 156/109 X |
| 3,876,489 | 4/1975 | Chenel | 156/109 X |
| 4,085,238 | 4/1978 | Chenel et al. | 156/109 X |

*Primary Examiner*—Robert Mackey
*Attorney, Agent, or Firm*—Pennie & Edmonds

[57] ABSTRACT

An apparatus is disclosed for applying a plastic filament on the periphery of a face of a glass sheet which is adapted for use in the production of a multiple window pane unit. The apparatus includes an extrusion device for extruding on the glass sheet a plastic material having a viscosity greater than 115° Mooney at the end of an 8 minute test at 40° C. as measured by a Mooney consistometer, and support means defining a surface for supporting a glass sheet. The extrusion device includes a body portion and head member and an extrusion nozzle carried by the head member for extruding the plastic material. The nozzle extends from the head at right angles to the longitudinal axis of the device and the head is rotatable relative to the body portion about the longitudinal axis of the device to permit orientation of the nozzle at an angle of about between 15° and 45° with respect to the plane of the face of the glass sheet which is supported by the supporting means. The apparatus also includes means connected operatively to the body portion for vertically adjusting the extrusion device in conjunction with changing the angular orientation of the nozzle.

5 Claims, 7 Drawing Figures

APPARATUS FOR APPLYING A THICK SEAL TO A GLASS SHEET

This is a continuation, of application Ser. no. 639,787, filed Dec. 11, 1975, now abandoned.

This invention relates to a multiple pane insulating window comprising two or more transparent or translucent sheets separated by an intermediate seal of plastic material between the sheets around the periphery of the window which seals the air space between the sheets.

In the course of the present description reference will be made to sheets made of glass, but the invention is not limited thereto.

In multiple pane windows the joints or seals have a dual function. Firstly, they ensure seal tightness of the inner air spaces situated between the sheets of glass by preventing the entry of vapors and dust from the outside air and, secondly, they keep the sheets of glass firmly fixed in proper position with respect to one another with a given spacing therebetween.

When these joints or seals are made of plastic material they comprise an inner filament consisting of a first plastic material such as polyisobutylene, and an outer mastic layer consisting of a second organic material such as a silicone or polysulfide elastomer. This mastic layer is injected between the filament and the edges of the sheets and, by virtue of its excellent adhesive properties, it keeps the sheets in correct position, while simultaneously ensuring sealtightness. The inner filament acts, inter alia, as a spacer. To ensure that the moisture contained in the air space separating the two sheets of glass is absorbed, a desiccant such as silica gel, levilite or a material constituting a molecular sieve is incorporated in the inner filament.

The intermediate seals of multiple pane insulating windows may be produced from rods of thermofusible and self-adhesive material known as "hot melt" and , with such material, it is possible to obtain relatively large spaces between the sheets of glass. However, it has not yet been possible to render the manufacturing process entirely automatic.

Extruded filaments have proved particularly suitable for automated manufacture. Automatic apparatus designed for applying the inner filament and the outer mastic layer have been described in U.S. Pat. Nos. 3,876,489, 3,990,570 and 4,088,522, U.S. application Ser. No. 621,026, and French Pat. Nos. 2,195,566 and 2,207,799, all assigned to the assignee hereof.

When thick filaments are being deposited, for example using machines such as those described in the aforementioned French Pat. No. 2,207,799, it is necessary for the plastic material to have specific characteristics, particularly with regard to its viscosity, thereby enabling it to be extruded and providing it with good properties of adhesion to glass.

Plastic filaments have produced good results in the case of air spaces of approximately 5–6 mm in thickness, but above these thicknesses the known filaments may be deformed and will no longer perform their spacing and sealing functions in a satisfactory manner. Similarly to the thickness of the layer of air between the sheets, the thickness of the intermediate seal refers to its dimension measured perpendicularly to the glass sheets.

The applicants have found that it is possible to obviate the disadvantages which are encountered in producing multiple pane windows having a very thick intermediate seal by forming the intermediate seal from a material which has a viscosity in excess of 115° measured on a Mooney consistometer during and 8 minute test at 40° C.

The organic material constituting the filament can advantageously comprise a mixture of polyisobutylene and Butyl rubber (isobutylene isoprene copolymer), with the ratio of the weight of the polyisobutylene to the weight of the Butyl rubber between 4:1 and 8:1, and preferably approximately 6:1.

In view of the physical characteristics of the filament, particularly its viscosity and adherence to glass, it is necessary to extrude the filament at a defined angle with respect to the plane of the glass.

The invention thus relates to a process for applying an intermediate filament to a face of a transparent or translucent sheet around the periphery thereof, for the purpose of producing a multiple pane window. This process is characterized in that a composition which has a viscosity in excess of 115° measured on a Mooney consistometer after 8 minutes and at a temperature of 40° C. is extruded onto the sheet and in that the material is deposited in such a way that the axis of the extrusion nozzle at the nozzle exit forms an angle of 15–45°, and preferably 25–35°, with respect to the sheet.

The windows produced by means of this process, and especially windows having a very thick intermediate filament, constitute another aspect of the invention.

The invention also relates to a device for implementing the process described above. This device is characterized in that it comprises an extruding device having a head which is rotatably mounted on the body portion thereof. The position of the body portion is also vertically adjustable with respect to the plane of the sheet onto which the extruded filament is deposited.

According to another feature of this device, the head and body each have a collar or flange with tapered or conical sides. The two flanges are joined by a collar or clamp having an inner profile complementary to the conical sides of the flanges.

Other objects, features, and advantages of the present invention will be made apparent in the following description of a preferred embodiment thereof, with reference to the accompanying drawings, in which.

Figure 1:
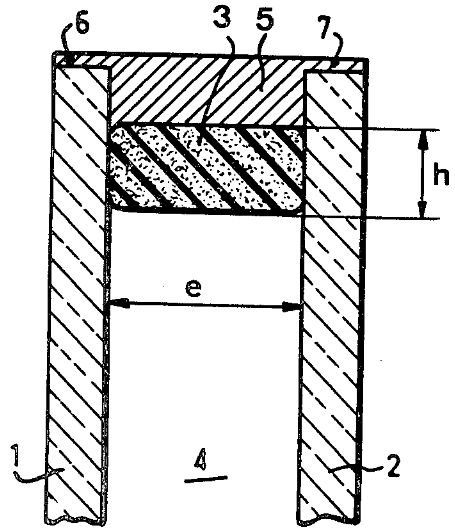
FIG. 1 is a partial sectional view of a double pane window having a very thick intermediate filamentary seal.

Referring to FIG. 1, a double pane window comprises sheets of glass 1 and 2 between which an intermediate filament 3 is interposed, the sheets being separated by an air space 4. The sheets of glass are held in place by an outer polysulfide layer 5. Double pane windows designed to ensure good thermal insulation should have a relatively thick layer of air 4. Accordingly, the filament 3 should possess considerable thickness e with respect to its width h.

In the automatic apparatus described in the above-mentioned patents and patent applications, the filament 3 is deposited by the extrusion nozzle of an extrusion machine directly onto one of the sheets of glass, for example onto sheet 1. The second sheet 2 is then placed on the filament 3 and the unit is pressed in order to adhere the sheets of glass in a tight and continuous manner against the filament 3, thus producing a sealed joint. The outer layer 5 is then deposited in situ between the two sheets of glass, in the space between the filament 3 and the edges 6 and 7 of the sheets, as well as on these edges.

It will be appreciated that, in order for the filament 3 to be automatically placed on a sheet 1, it will be necessary for the material forming the filament to possess good properties of adhesion to glass, and also adequate viscosity. If the filament does not adhere well to glass, it will be impossible to apply it automatically as it will slide on the surface of the glass as the sheet moves beneath the extrusion nozzle. Similarly, if the filament does not possess the requisite viscosity properties for a given thickness, it will deform, sag or bend, so that when the second sheet of glass is placed thereover it will be impossible to insure seal tightness by pressing.

The applicants have found that it is possible to automatically apply a filament having a thickness in excess of 4 mm and preferably in excess of 12 mm, or even up to 19 mm and higher, with compositions having a viscosity at the end of 8 minutes and at a temperature of 40° C. which is higher than 115° expressed as Mooney degrees in a test carried out according to the French Standard NFT 43005 using a Mooney consistometer. Compositions of this type are formed, for example, of a mixture comprising polyisobutylene and Butyl rubber. The ratio of the weight of polyisobutylene to the weight of the Butyl rubber is between 4 and 8, and preferably approximately 6. The quantities of the constitutents in these compositions are, for example, within the following ranges, expressed in terms of percent by weight:

Polyisobutylene: 40–70%
Butyl Rubber: 5–17.5%
Carbon Black: 10–40%
Levilite: 0–20%
Molecular sieve: 0–5%.

The molecular sieve used as a desiccant preferably consists of a mixture of molecular sieves having absorption pore dimensions of about 4 Å and 10 Å, respectively. The proportions by weight of the sieves in the mixture are 0–4% and 0–1% of the total weight of the filament for 4 Å and 10 Å pores, respectively.

For example, a filament having the following composition -

Figure 2:
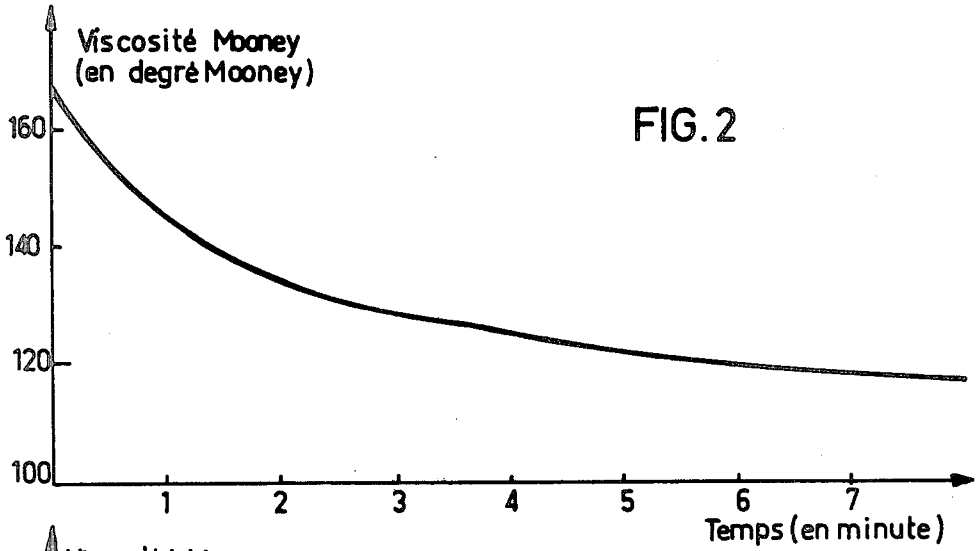
FIG. 2 is a curve illustrating the variation in the Mooney viscosity of the material for forming the intermediate seal, as a function of time and at 40° C.
Figure 3:
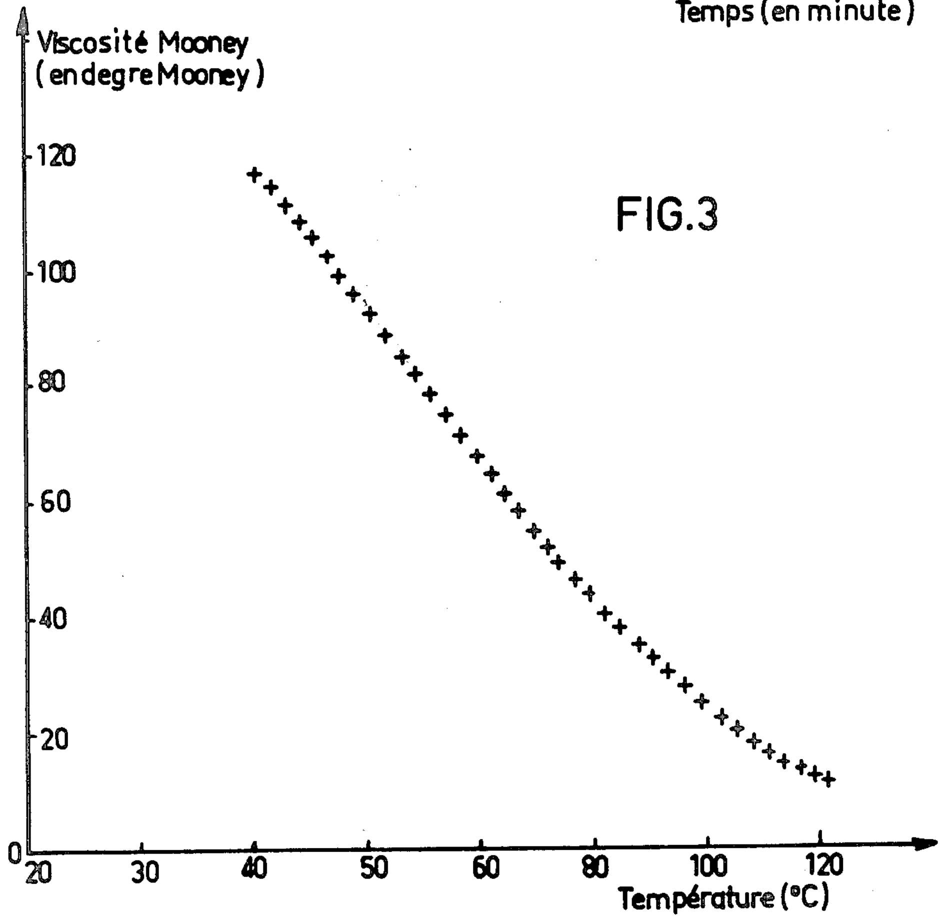
FIG. 3 is a curve illustrating the variation in the Mooney viscosity of the material as a function of the temperature at the end of 8 minutes.

Polyisobutylene: 50%
Butyl Rubber: 10%
Carbon Black: 17.5%
Levilite: 20%
Molecular sieve: 2.5% when subjected to shearing tests according to the aforementioned French Standard NFT 43005, by means of a Mooney consistometer, yielded the viscosity curves as a function of temperature and time shown in FIGS. 2 and 3. It was found that at 40° C., after 8 minutes, the viscosity of this composition is even higher than 115° Mooney.

A filament of this type can be automatically deposited on a plate of glass at a speed of at least 30 cm/s by virtue of the fact that it adheres sufficiently well to glass and that it is not subject to deformation at thicknesses up to 19 mm and even higher.

Figure 4:
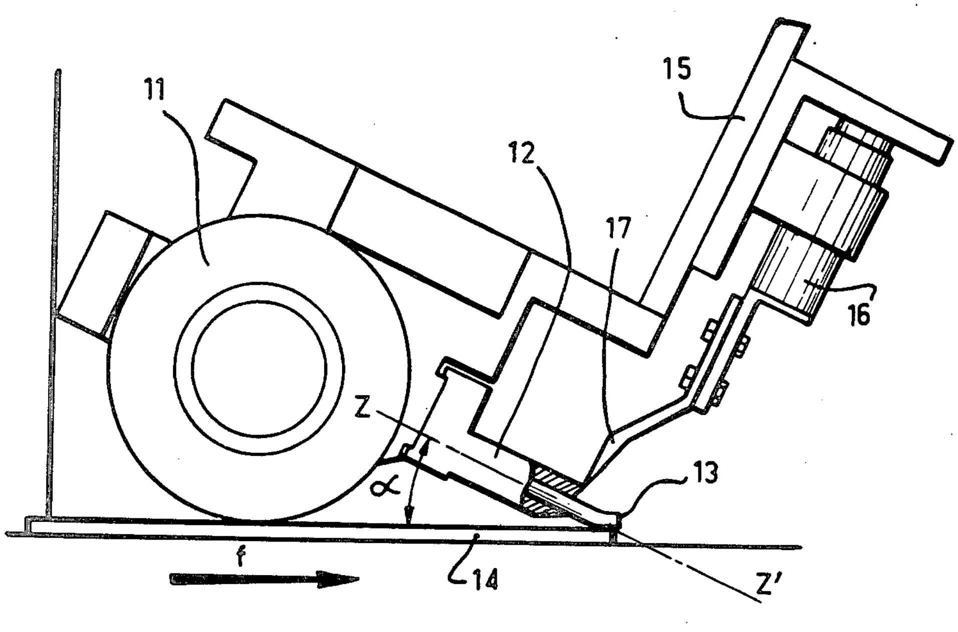
FIG. 4 is a front, partial sectional view of the extrusion device used for applying the intermediate filament.

The filament may be deposited by means of the process according to the present invention. This process consists in applying the filament onto one of the sheets of glass in such a way that its axis forms an initial angle $\alpha$ of 15–45°, and preferably 25–35°, with respect to the line of application. FIG. 4 is a front, partially sectional view of the head of the extrusion device and of the extrusion nozzle. It shows their position with respect to the glass sheet onto which the filament is extruded. The head 11 of the device carries on its side an extrusion nozzle 12, the axis $ZZ_1$ of which is also the axis of the filament 13 at the exit end of the nozzle, and it forms with the plane of the sheet of glass 14 an angle $\alpha$. On the same side of the head, a support 15 carries a jack 16 which actuates a blade 17 designed to cut the filament when the latter has been deposited on the four sides of the sheet glass 14. The sheet is carried by a conveyor (not shown in this figure) and moves beneath the extrusion nozzle 12 in the direction of arrow f. A pivoting device (not shown) makes it possible to move the four sides of the sheet of glass in turn beneath the nozzle.

The angle $\alpha$ can vary between 15° and 45° to insure correct placement and adhesion of the filament to the sheet of glass, and is a function of a number of parameters such as the temperature, the state of the surface of the glass, the rate of movement, etc. The angle can be adjusted by means which enables the extrusion head 11 to be rotated about its longitudinal axis.

Figure 5:
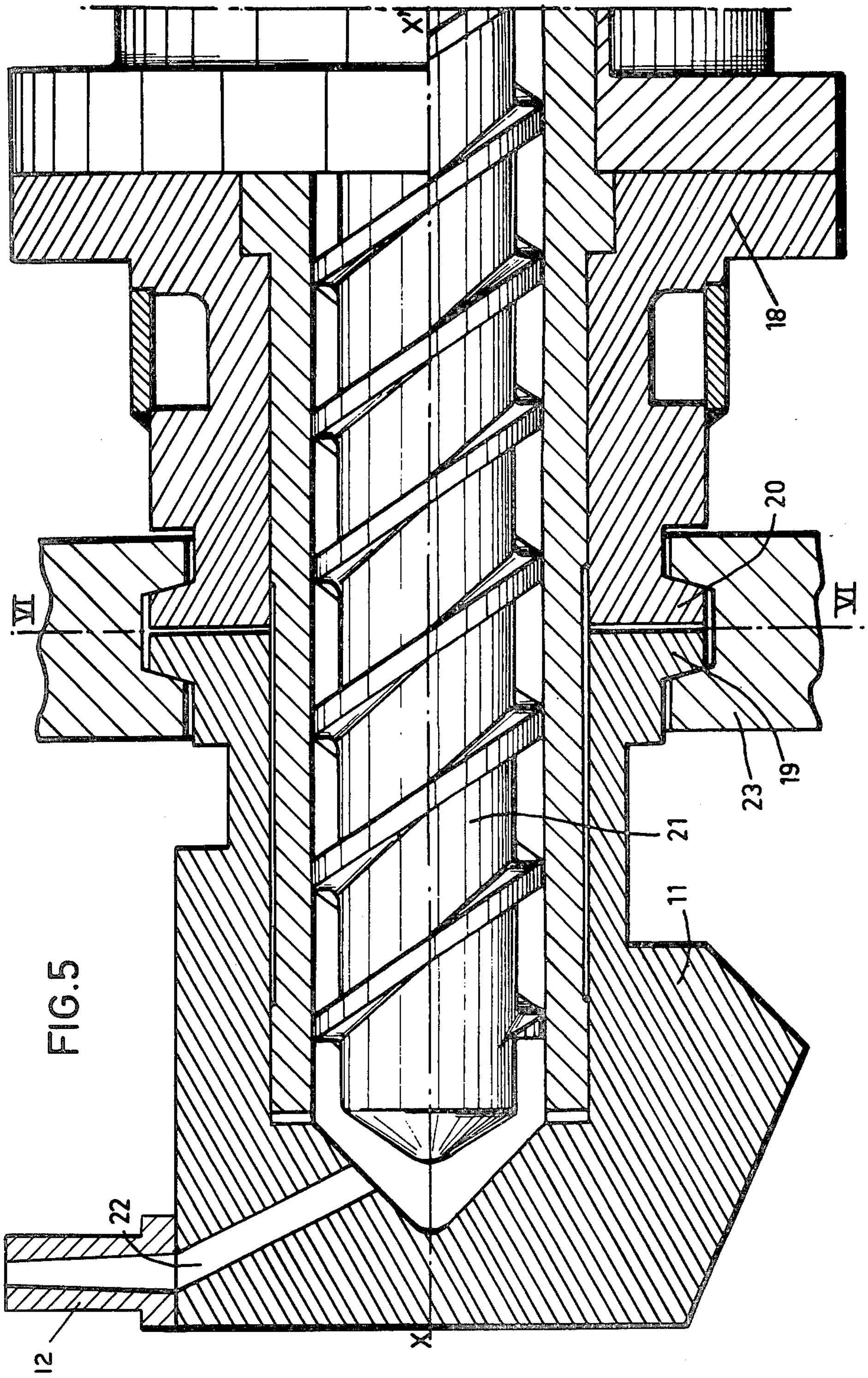
FIG. 5 is an axial section of the extrusion head and a portion of the body portion of the device shown in FIG. 4.

As shown in FIG. 5, the extrusion head 11 and the body portion 18 of the extrusion device each have a collar or flange 19 and 20. The outer surfaces of the flanges are tapered in conical configuration. Inside the head 11 and the body 18 is disposed the extrusion screw 21 which compresses the plastic material for the filament and thus supplies the extrusion channel 22. The extrusion nozzle 12 (not shown in this figure) is disposed at the discharge end of the extrusion channel 22. The extrusion head 11 and the body portion 18 are maintained in contact with one another by means of a collar or clamp 23.

Figure 6:
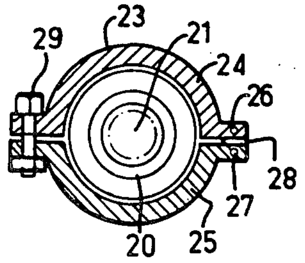
FIG. 6 is a transverse section along the line VI—VI of FIG. 5.

As shown in FIG. 6, the collar or clamp 23 consists of two halves 24 and 25 pivoted at 26 and 27 to a bar 28. A bolt 29 clamps the halves together. As shown in FIG. 5, each of the half collars has an inner arcuate channel in the form of a double cone mating with the sides of flanges 19 and 20.

It is readily apparent that by releasing the bolt 29 it will be possible to rotate the extrusion head 11 and thereby adjust the angle $\alpha$ (FIG. 4) and that by tightening the bolt 29 the head will be fixed in the adjusted position, at the same time providing seal-tightness between the head and the body 18 of the device.

When adjusting the angle $\alpha$, the distance between the sheet of glass 14 and the end of the extrusion nozzle 12 will be varied. To ensure that optimum work conditions are always obtained it is also an advantage to be able to adjust and maintain this spacing in order to obtain the desired value. This is rendered possible by the arrangement shown in FIG. 7.

Figure 7:
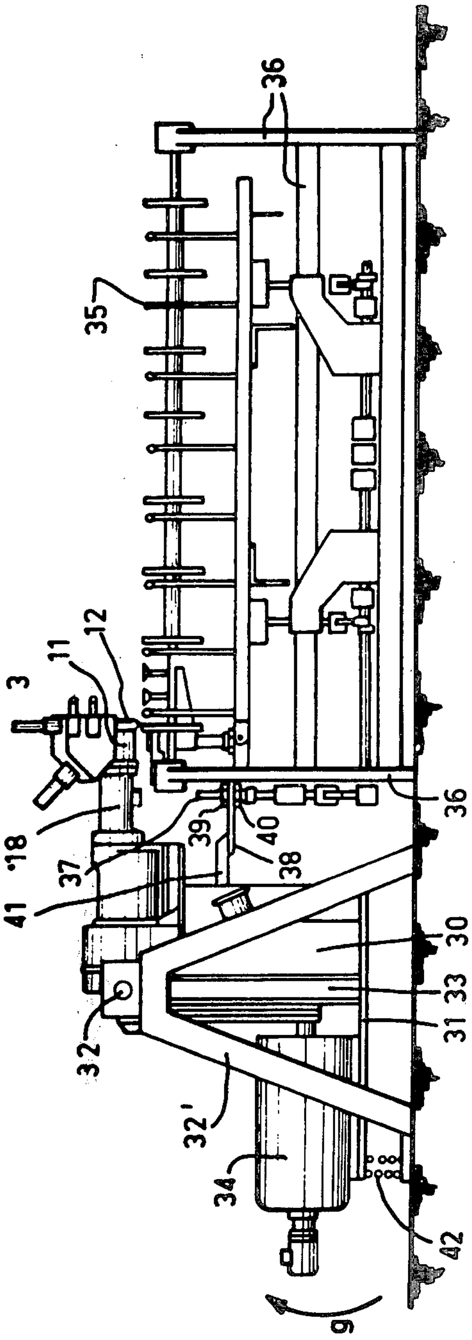
FIG. 7 is an elevational view of the apparatus for adjusting the vertical position of the extrusion device.

In FIG. 7 the extrusion unit 30 is supported by a platform 31 mounted in a pivotal manner on the axle 32 through the intermediary of the beam 33. The axle 32 is supported by the stationary frame $32^1$. Motor 34 drives the device which comprises, inter alia, the body portion 18 and the extrusion head 11 bearing at its end the extrusion nozzle 12.

The right half of FIG. 7 shows a conveyor generally designated as 35 which is designed to move the glass sheet beneath the extrusion nozzle and to rotate it 90° each time the filament has been deposited on a particular edge. This unit is described in copending application Ser. No. 639,788 filed Dec. 11, 1975 now U.S. Pat. No. 4,085,238 and entitled "Process and Apparatus for Applying Plastic Filaments to Sheets for Multiple Pane Windows," and assigned to the assignee hereof. Accordingly it will not be described here in detail.

In this figure, a threaded shaft 37 has a vertically adjustable abutment 38 fixed in position by two nuts 39 and 40. The shaft is mounted in vertical bearings (not shown) carried by the frame 36. An abutment 41 integral with the extrusion unit 30 comes to rest against abutment 38, the platform 31 being pivoted in the direction of the arrow g by the action of the compression spring 42. It will be noted that in order to adjust the distance between the extrusion nozzle 12 and a sheet of glass carried by the conveyor 35, not shown in this figure, it is only necessary to adjust nuts 39 and 40 to raise or lower the abutment 38.

As will be understood from the foregoing, the present invention provides, in the production of a multiple pane window, a process for applying a plastic filament on the periphery of a face of a transparent or translucent sheet which comprises extruding a plastic material from an extrusion nozzle onto the face of said sheet at an angle at the nozzle exit which is between 15° and 45° with respect to the plane of the face of the sheet, said plastic material having a viscosity greater than 115° Mooney at the end of an 8 minute test at 40° C. as measured by a Mooney consistometer. Preferably the angle is between 25° and 35°. Further specific features are given in the above description of specific embodiments thereof.

The invention also provides apparatus for carrying out the above process comprising an extrusion device for extruding a plastic material having a viscosity greater than 115° Mooney at the end of an 8 minute test at 40° C., as measured by a Mooney consistometer, said extrusion device having an extrusion nozzle for extruding said plastic material onto the face of a said sheet at an angle at the nozzle exit which is between 15° and 45° with respect to the plane of the face of the sheet, support means for supporting a said sheet beneath said nozzle exit, said extrusion device having a body portion and a head carrying said nozzle and rotatably adjustably mounted on the body portion, and means for vertically adjusting said body portion with respect to the plane of the face of the sheet onto which the plastic material is applied. Advantageously the angle is between 25° and 35°. Further features of the apparatus are described above in connection with the specific embodiment.

The invention also provides a multiple pane window comprising a pair of transparent or translucent sheets with a filamentary seal between the sheets around the periphery of the window, said filamentary seal being formed of a plastic material having a viscosity greater than 115° Mooney at the end of an 8 minute test at 40° C. as measured by a Mooney consistometer. Preferred mixtures for the plastic material, and preferred mixtures for the molecular sieve, and other features are set forth in the foregoing description.

We claim:

1. An apparatus for applying a plastic filament along a line onto the periphery of a face of a glass sheet which is adapted for use in the production of a multiple window pane unit, said apparatus comprising in combination:

(a) an extrusion device having an extrusion nozzle for extruding a plastic material on the glass sheet;

(b) support means defining a surface for supporting the glass sheet;

(c) said extrusion nozzle being situated in spaced relation above the supported glass sheet and disposed in a plane extending through the line along which the plastic material is to be applied;

(d) said extrusion device including a body portion and head member disposed along a predetermined axis extending transversely to the plane in which the nozzle is disposed;

(e) said head member being rotatably mounted on the body portion for rotation about said predetermined axis for selectively positioning the nozzle at a variable angle with respect to the plane of the sheet; and (f) means operatively connected to said body portion for vertically adjusting the body portion, head member and nozzle relative to the plane of the sheet onto which the plastic material is applied to position the nozzle at a vertical height related to the angle of the nozzle and the thickness of the plastic material being applied to the glass sheet.

2. An apparatus according to claim 1 wherein:

(a) the plastic material being extruded has a viscosity greater than 115° Mooney at the end of an 8 minute test at 40° C., as measured by a Mooney consistometer; and (b) the body, head member and nozzle of the extrusion device are vertically adjustable over a range permitting adjustment, through rotation of the head member, of the angle at which the nozzle is positioned relative to the plane of the sheet over a range of angles between 15° and 45° without changing the height of the outlet of the nozzle relative to said plane.

3. An apparatus according to claim 2 wherein: (a) said angle is between 25° and 35°.

4. An apparatus according to claim 2 wherein:

(a) said body portion and head have cooperating flanges with tapered outer surfaces; and (b) clamp means including arcuate channeled members mate with said tapered flanges for holding the flanges together.

5. An apparatus according to claim 2 wherein:

(a) the extrusion device is mounted for pivoting movement about a pivot axis extending perpendicular to said predetermined axis; and (b) the means for vertically adjusting the height of the body, head member and nozzle of the extrusion device includes:

(i) means for pivoting the extrusion device about said pivot axis, and (ii) support means for supporting the extrusion device in a selected pivoted position.

* * * * *